April 8, 1952     W. R. EDDY ET AL     2,592,259
AUTOMATIC SELECTOR, CHANGE-OVER REGULATOR AND INDICATOR DEVICE
Filed March 16, 1946     4 Sheets-Sheet 1

INVENTOR.
William R. Eddy
Theodore A. St. Clair
BY Darby & Darby
Attys.

April 8, 1952 W. R. EDDY ET AL 2,592,259
AUTOMATIC SELECTOR, CHANGE-OVER REGULATOR AND INDICATOR DEVICE
Filed March 16, 1946 4 Sheets-Sheet 3

INVENTOR.
William R. Eddy.
BY Theodore A. St. Clair.

Darby & Darby
Att'ys.

April 8, 1952 W. R. EDDY ET AL 2,592,259
AUTOMATIC SELECTOR, CHANGE-OVER REGULATOR AND INDICATOR DEVICE
Filed March 16, 1946 4 Sheets-Sheet 4

INVENTOR.
William R. Eddy
BY Theodore A. St.Clair

Darby & Darby
Att'ys.

Patented Apr. 8, 1952

2,592,259

UNITED STATES PATENT OFFICE 2,592,259

AUTOMATIC SELECTOR, CHANGE-OVER REGULATOR AND INDICATOR DEVICE

William R. Eddy and Theodore A. St. Clair, Bartlesville, Okla., assignors to Phillips Petroleum Company, a corporation of Delaware Application March 16, 1946, Serial No. 654,992

16 Claims. (Cl. 50—10)

1

This invention relates to automatic selector, change-over and pressure regulator devices useful in dispensing fluids under pressure, and it has particular application in systems supplying gas from portable storage cylinders to atmosphere and commercial burners and appliances located on the property of the consumer.

More specifically the invention relates to devices of this type as used in liquefied petroleum gas systems now quite widely used in domestic installations.

The use of liquefied petroleum gas for fuel has become quite common. In designing systems for dispensing this gas for use there are certain problems created by questions of cost and lack of familiarity on the part of the users with the installation and adjustment of mechanical apparatus. In the usual system the consumer is provided with two small tanks of liquefied gas, one of which is in use while the other stands by in reserve. When the tank in use becomes exhausted it is desirable to immediately and automatically place the second tank in use with rapidity as not to interfere with any equipment which is at that time in operation, and without extinguishing, for example, pilot lights. The second tank being placed on supply automatically, the empty tank can be removed at leisure and replaced by a full tank.

Any mechanism which will effect such operation and have the required safety features is, therefore, of practical utility. In the design of such equipment attention must be given to the lack of mechanical skill on the part of most users of such equipment. It is desirable that any manipulations be as simple and foolproof as possible. Additionally, clear indication at all times of the condition of the contents of the tank and which of the tanks is in use is desirable.

One object of this invention in view of these premises is to provide a simple, fully automatic selector, change-over, pressure regulator and indicator for liquefied pertoleum fuel supply systems of this type in which provision is made for manual selection.

Another object of the invention is to provide a device which has the functions of first stage pressure regulation, automatic selection and change-over, and indication with a minimum variation in the pressure of the gas supply.

Another object is to provide a control device of this type which is relatively simple in construction, is composed of a minimum of parts, and is capable of efficient operation when directly exposed to outside weather conditions.

2

Other objects of the invention are to provide a device of this kind employing biasing means so that the valve for one tank will open before another, to provide a novel connection between an operating knob and the biasing means, and to provide novel means for indicating the position of the biasing means.

Another object of this invention is to provide a change-over device and cooperating system for connecting a plurality of liquefied petroleum gas containers automatically for use in a selected order and to supply gas at a predetermined constant pressure to at least one dispensing conduit.

Other advantages of the invention will be apparent from the following description of the embodiment illustrated in the attached drawings, including provisions for safety, simplicity and certainty of operation.

This invention resides substantially in the combination, construction, arrangement and relative location of parts, all as will be described in detail below.

In the accompanying drawings.

The change-over and pressure regulator of this invention, as illustrated, is adapted for the selective control of the supply of gas from two cylinders, but as those skilled in the art will appreciate, duplication of certain parts thereof will adapt it for use with more than two gas cylinders.

Figure 1:
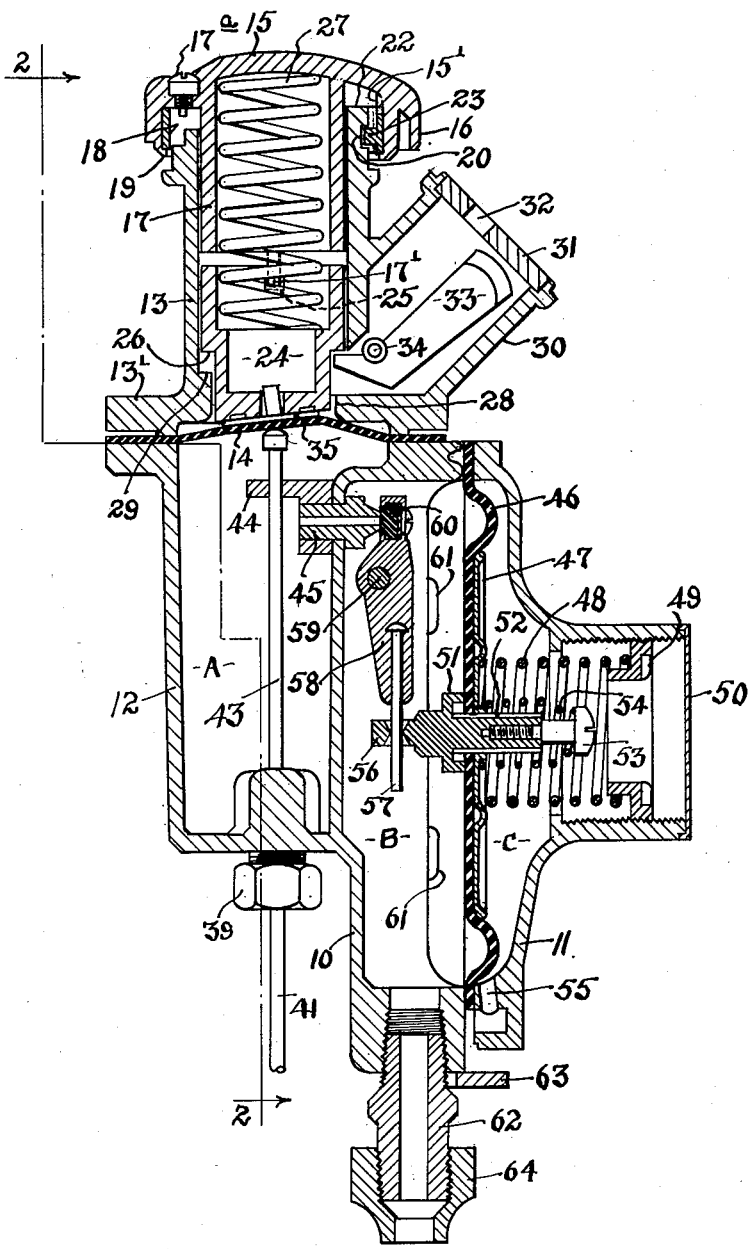
Figure 1 is a vertical, central, cross-sectional view through the automatic change-over and pressure regulator embodying the subject matter of this invention.

In outline it may be stated that the gas is supplied through either of the conduits 41 and 42 from the respective tanks or cylinders to which they are connected in the usual manner. After flowing through the first pressure reducing valve comprising the first stage of pressure reduction the gas charges space A, Figure 1, of the device, and from there enters the space B through the port in the nozzle 45 under the control of the valve 60. From there it passes to the gas supply conduit of the user through the nipple 62, coupler 64 and supply conduit, not shown, connected thereto. For purposes of safety excess pressure can be relieved around the valve 51 and its fluted stem into compartment C, and from there to the atmosphere through the port 55.

Structurally the device comprises a housing consisting of the generally flat circular portion 10 and detachable cover 11. The portion 10 has, laterally, a semi-tubular portion 12 forming therewith a chamber A. The cover 11 is detachably secured to the housing part 10 by means of removable screws in a well known manner, and there is clamped between these housing parts a flexible gas impervious diaphragm 46 which provides one wall of the chamber B and one wall of the chamber C. The chamber A is closed at the top by means of a flexible, gas impervious diaphragm 14 which is clamped between the housing part 10 and the detachable bonnet 13.

Figure 7:
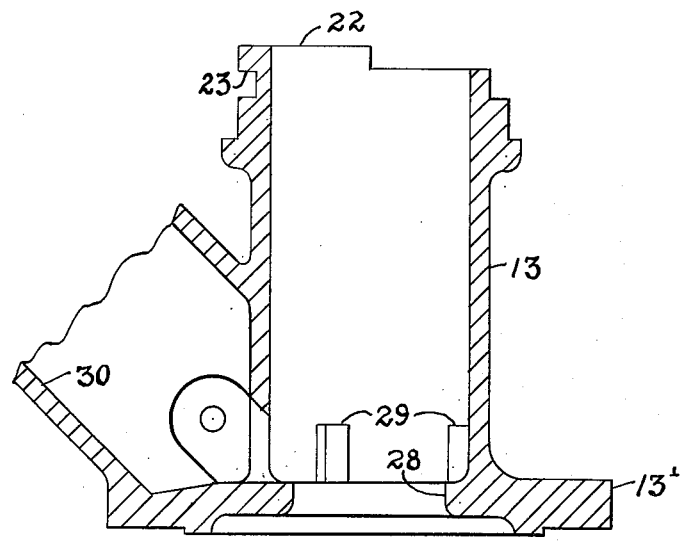
Figure 7 is a cross-sectional view taken on the line 7—7 of Figure 3.

The bonnet 13 comprises an extended cylindrical portion terminating at the lower end in a flange 13' by means of which a sealing connection is made with the housing part 10 and by which the diaphragm 14 is secured in place. As more clearly shown in Figures 3 and 7, the bonnet is provided with a concentric opening 28 substantially in the plane of the flange 13' and a plurality of stops 29' project into the cylindrical passage through the bonnet for a purpose to be described later. The upper end of the cylindrical portion of the bonnet is provided with a nozzle extension 22 of a circumferential length slightly less than one-half the circumference of the cylindrical portion 13. This extension forms an annular exteriorly opening groove 23 of the same circumferential extent.

Figure 5:
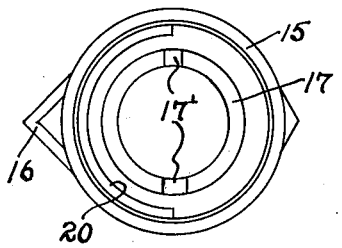
Figure 5 is a bottom plan view of the regulator knob.
Figure 6:
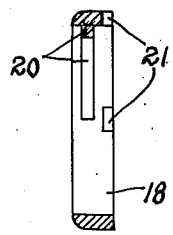
Figure 6 is a central, cross-sectional, detailed view of the knob retaining member.

A control knob 15 is provided which is shaped in outline as is clear from the figures, see particularly Figure 5, to provide a pointer or arrow 16. The cap has an integral tubular extension 17 which has a turning fit in the upper end of the cylindrical portion 13 of the bonnet. The lower end of the tubular portion 17 is provided with a pair of diametrically opposed lugs 17', one of which is wider than the other, as shown in Figure 5, and lying in a plane at right angles to the longitudinal axis of the arrow formation of the cap. Within the knob 15 in an annular seat provided for it, is a retaining ring 18 by means of which the cap is retained in operating position. This ring is constructed as shown in Figure 6, and consists of an annular body portion having an inwardly radially extending rib 20 having a minimum of 180 degrees circumferential length. As is clear from Figure 1, this rib 20 cooperates with the annular groove 23 in the bonnet.

Figure 3:
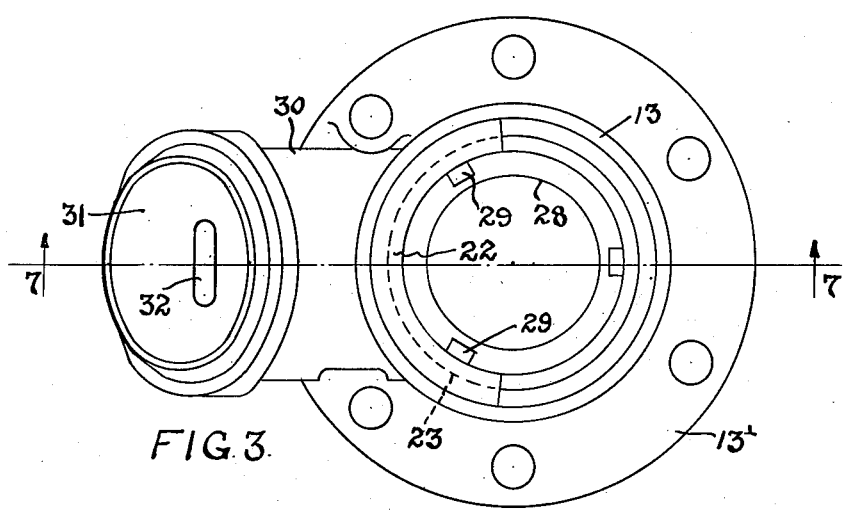
Figure 3 is a plan view of the upper portion of the housing with the control knob and associated parts removed.
Figure 4:
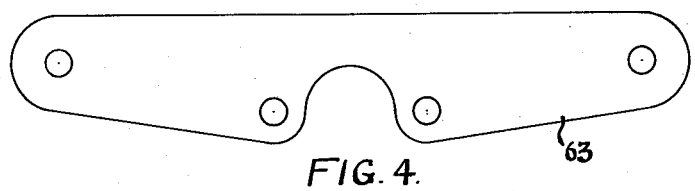
Figure 4 is a plan view of a supporting bracket for the device.

By reference to Figure 3 it will be seen that in one position of the cap 15 the rib 20 will be entirely free of the groove 23 so that the cap and attached parts can be removed. The ring 18 is secured in the cap by rolling or beading over the edge 19. The ring 18 is preferably provided with several marginal notches 21 which receive indexing projections 15', see Figure 1, formed integral with the cap. This insures that the ring 18 will be locked in the cap in the proper circumferential position. Cap 15 is provided with a stop screw 17ª which has its inner end projecting interiorly of the cap in position to strike the shoulders formed by the circumferential interrupted projection 22 on the upper end of the cylindrical portion 13 of the bonnet.

Upon consideration it will be seen that with this construction the cap can be fitted over the open end of the bonnet with the screw 17ª withdrawn and turned until the rib 20 interlocks with the annular groove 23. When the stop screw 17ª is reset in position the cap can be given a maximum rotation in either direction through an angle of about 180 degrees without disengaging the rib 20 from the groove 23. This prevents the cap from coming off in normal use and the stop screw 17ª permits positioning of the cap in either of its two operating positions in which the pointer end 16 points towards the container in actual use. The containers are disposed on opposite sides of the device when it is viewed, for example in Figure 2, wherein it is noted that the pointer end 16 would indicate that the right hand container, the one connected to the pipe 42 is at that time on supply.

Figure 9:
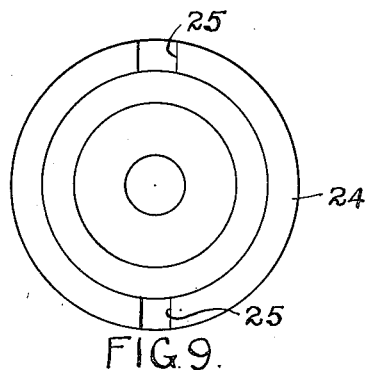
Figure 9 is a top plan view of this cam.
Figure 8:
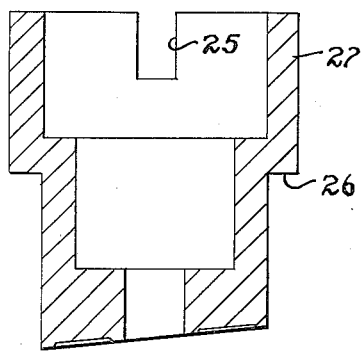
Figure 8 is a vertical, central, cross-sectional view through the biasing or change-over cam.

Within the bonnet 13 is a cylindrical cam 24 which is composed of two portions of different diameter to form the annular shoulder 26 lying in a plane at right angles to the longitudinal axes of the cam. The construction of this cam is clearly shown in Figures 8 and 9. The upper edge thereof is provided with a pair of diametrically opposed marginal notches 25 and the lower terminal face of the cam lies in a plane at an angle to the longitudinal axis of the cam. As is clear from Figure 9, the notches 29 are of different widths for cooperation with the lugs 17' of the cap extension, thus insuring that the cap and its pointer will be in proper circumferential relation to the caming face of the cam. Interposed between the cap and the cam is a compression spring 27.

The bonnet 13 is provided with an angularly extending housing 30 of circular cross-section closed at its outer end by means of a disc 31 having an observing window 32 therein. Pivotally mounted in the extension 30 is a weighted indicator arm 33 which is pivotally mounted at 34 and has an extension which lies under the shoulder 26, all as is clearly shown in Figure 1.

Interposed between the caming face of the piston 24 and the flexible diaphragm 14 is an antifriction disc 35 which is simply a circular plate of suitable material having a central extension lying in a central opening in the end of the cam. This disc permits of easy relative turning of the cam on its longitudinal axis with respect to the diaphragm 14 and eliminates the effect of the tendency of a diaphragm of this type to stick after considerable usage to any surface with which it is in contact. This diaphragm, as are the other diaphragms of the device, is of some gas impervious, moisture resistant material such as rubberized canvas commonly used in this art for this purpose.

Figure 2:
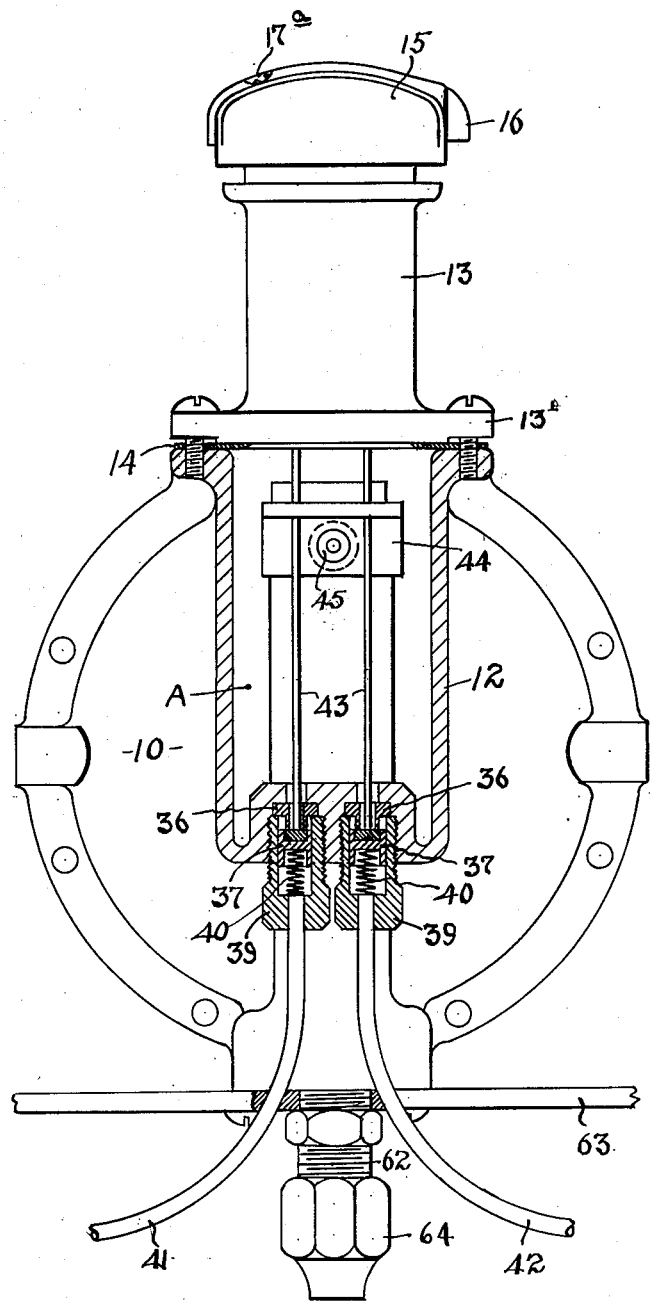
Figure 2 is a view from the left hand side of the structure of Figure 1, showing some parts in cross-section and some parts in elevation as they would appear on the plane 2—2 of Figure 1.
Figure 10:
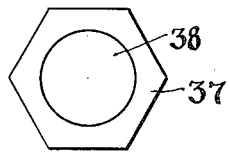
Figure 10 is a top plan view of a valve member.

The bottom wall of the lateral housing extension 12 is thickened as shown in Figure 2, and is provided with a pair of parallel passages in which annular seat forming members 36 are locked by means of the threaded nipples 39. These nipples are counterbored to form recesses in which the valve members 37 may slide under the biasing effect of the compression springs 40. The valve members 37 are of noncircular cross-section exteriorly, as clearly shown in Figure 10, and are provided with suitable sealing discs 38. These discs, for example, can be made of natural or synthetic rubber and the like. The gas containers are connected to the nipples 39 by means of the conduits 41 and 42 which are secured thereto in any suitable manner, as by sweating them in.

A pair of vertically extending rods 43 engage the valves 37 at their lower ends and are engaged at their upper headed ends by the diaphragm 14. These vertically movable rods are guided near their upper ends by means of a bracket 44 which serves to secure in place a nozzle member 45 in the adjacent wall of the part 10. The nozzle member has a passage therethrough, as shown, to establish communication between the compartments A and B.

The diaphragm 46 is engaged on one side by means of a circular plate 47 on which one end of a compression spring 48 seats. The other end of this spring bears on an annular member 49 which threadedly engages an extension on the cover 11. By means of this structure the loading effect of the spring 48 on the diaphragm can be adjusted. The outer end of the hub of the cover 11 is closed by means of a removable cap 50.

The diaphragm 46 and the plate 47 have a central opening through which a valve member 51 extends. The right hand end of this member is externally fluted, as indicated at 52 and a screw 53 is mounted on that end to form a seat for one end of a spring 54, the other end of which fits over an annular integral lip on the plate 47. The end 56 of the valve member 51 is provided with a fulcrum forming aperture through which a pin 57 extends. This pin is molded in a lever 58 which is pivotally mounted at 59. The pivot pin 59 being mounted in the housing part 10. The other end of the lever 58 has a replaceable seat 60 of any suitable resilient valve material such as natural or synthetic rubber for cooperation with the seat formed by the end of the nozzle 45.

As previously mentioned, the compartment C is open to the atmosphere through a vent port 55 formed in the cover 11.

The lower part of the housing portion 10 is provided with a threaded passage in which a coupling nipple 62 is mounted. The service supply line for the installation is connected to the nipple 62 by means of a threaded coupling member 64. The bracket 63 shown in place of Figure 2 is secured to the lower end of the portion 10 of the housing, and by means of it it is attached to any suitable adjacent structure at the point of installation.

The inner face of the wall forming the chamber of compartment B is provided with projections or lugs 61 which form a stop to limit the inward movement of the diaphragm 46 to prevent undue collapsing thereof.

The operation of this device while apparent to those skilled in this art will be briefly reviewed. The system is initially set up for operation by connecting each of two full cylinders of liquefied gas to the conduits 41 and 42 by means of the usual types of coupling members, not shown. The service supply line, not shown, is of course connected to the device by the coupling 64 and the various utilities of the particular system are served thereby. To set the system in operation the knob 15 is moved to either limit of its position, as for example the position shown in Figure 2, which position is at right angles to the position shown in Figure 1. Thus the cylinder on the right, that is the one connected to the conduit 42, Figure 2, will be the tank in service at this time. In so positioning the knob 15 the high point 24a of the cam 24 will be directly over the right hand rod 43 of Figure 2, causing right hand valve 37 to open. However, under these transitory conditions assuming no pressure in the chamber A, spring 27 will have depressed the cam 24 until its shoulder 26 engages the stops 29, so that even though the low point of the cam is opposite the left hand rod 43, Figure 2, the valve 37 at the left of that figure will also be opened, with the result that both cylinders during this transitory condition will deliver gas into chamber A. If none of the utilities connected to the service pipe are in operation the pressure will build up very quickly in the chamber A and indeed will do so even if the utilities are in use, although at a slower rate.

As the pressure in chamber A increases, the diaphragm 14 will be forced upwardly against the resistance of spring 27 to a condition where the left hand valve 37, Figure 2, will close. However, the right hand valve 27 will not close so soon since it is held depressed by the high point of cam 24. Gas will flow through the nozzle 45 from chamber A into chamber B, it being noted that valve 60 will be open at this time (that is a time of low pressure in chamber B) because of the fact that compression spring 48 will have moved the diaphragm 46 to the left, thereby causing pivotal movement of the lever 58 so that valve 60 is open. Thus the gas will be fed from chamber A to chamber B through the nozzle 45 and from chamber B to the service pipe through the coupling 62. It is of course apparent that the supply of gas from the cylinder (or cylinders) will normally supply more gas to chamber B than is being withdrawn by the service pipe. The result is that pressure will build up in the chamber B, moving diaphragm 46 to the right and compressing spring 48. Valve 51 will be sealed on the diaphragm 46 by spring 54, the parts being proportioned for this relationship during all normal operating conditions. In other words, the diaphragm 46 and valve 51 will move together in sealed relation. Soon the pressure in chamber B will build up to the point where valve 60 will close, or will be sufficiently closed to maintain a demanded rate of gas supply. The same thing will happen to the right hand valve 37 due to the action of the pressure in chamber A on diaphragm 14.

It may be noted that when cam 24 moved upwardly into normal operating position, the weighted indicator arm 33 will drop out of sight through the window 32.

As previously noted, the pointer 16 will be pointing towards the cylinder in use.

When the useful quantity of gas has been withdrawn from the cylinder in use the pressure in chamber A will drop so that cam 24 can descend to a point where the left hand valve 37 opens so that gas is now supplied to the utilities through the conduit 41 and this left hand valve. This action, of course, results from the biasing effect of spring 27 on the cam, and the fact that it must descend further to open the left hand valve in view of the position of its high point in alignment with the end of the right hand rod 43, Figure 2. In other words, gas may be supplied from the second or left hand cylinder even though the knob 15 is not moved, but this happens at a lower position for the cam 24, with the result that the indicator 33 will now be visible through the window 32.

As the user of such a system keeps a watchful eye on its operation he will soon discover this fact by reason of this indication, and will rotate knob 15 180 degrees to its other position, at which time the pointer 16 will be pointing to the left, Figure 2, and indicating that the left hand cylinder is in use. This situation also advises him that the right hand tank is ready for replacement by a fresh tank which substitution, of course, will be made before the tank then in use is exhausted.

It is hardly necessary to note that rotation of the knob 15 causes the cam 24 to rotate with it by reason of the engagement of the lugs 17' in the notches 25. It is also apparent that this type of connection permits relative longitudinal movement between the cam and the sleeve 17 of the knob without breaking this rotating driving connection.

The valve 51 provides a safety valve, as those skilled in the art will understand, wherein if for any reason the pressure in chamber B exceeds a predetermined value its action on the diaphragm 46 will cause relative movement of valve 51 with respect to the diaphragm against the resistance of spring 54, so that valve 51 opens. The gas representing the excess pressure is then discharged into chamber C through the fluting 52 on the valve stem, and from there escapes to the atmosphere through the port 55.

As will now be apparent the stops 29 within the housing 13 limit the downward movement of cam 24 under the action of spring 27 under conditions of very low pressure in chamber A, so as not to overstrain the diaphragm 14. Likewise, the stops 61 perform a similar function for diaphragm 46. The springs 40, of course, continuously bias the valves 37 towards closed position so that they may follow all backward movements of the rods 43.

It will be seen that a pressure reduction is effected at the valves 37 and at the nozzle 45. In addition if required a pressure reducing valve will be included in the service supply line so that the gas reaching the utilities will be fed thereto at their intended operating pressures. Thus it will be seen that within the unit itself there are provided two first stage regulators or pressure reducing valves and a single second stage regulator or pressure reducing valve, namely valves 37 and the valve including the nozzle 45.

It has previously been explained how the knob 15 is retained in place against the force of spring 27 and how the stop screw 17 cooperates with the arcuate shoulder 22 on the bonnet 13 to give a positive positioning stop for the cap in either of its two positions.

It will be seen that the high gas pressure is confined to a very limited structural portion of the entire regulator, namely within the coupling members 39 and the seat forming members 36. The gas pressure which exists within the chambers A and B is considerably lower and in many cases will be the service pressure. Because of these conditions, it is possible to effect economies of construction which it is believed are novel. It is only necessary to make the parts 39 and 36 of high quality dense metal which will not permit transfusion of the gas through the walls thereof, and the other parts of the device, particularly the larger castings 10 and 11, may be made of less expensive more porous metals or materials. Thus the relatively small cheap parts 36 and 39 can be turned or cast from dense relatively expensive metals and the larger relatively more expensive housing parts 10 and 11 can be cast of cheaper and somewhat more porous metals.

From the above description of the structure and operation those skilled in the art will appreciate the novel features herein disclosed and obvious equivalents thereof, and we do not, therefore, desire to be limited to the illustrated example herein given, but only as required by the appended claims.

What is claimed is:

1. An automatic changeover regulator comprising a body forming a chamber having a flexible diaphragm forming at least a portion of one wall, a pair of spring biased valved inlets for said chamber, the valves of said inlets being biased to closed position, an outlet for said chamber, means engaged by said diaphragm for opening said valves, a rotatable cam engaging said diaphragm, and a tubular operating member engaged with said cam adjacent its periphery for effecting rotation of said cam about its periphery to positively operate said means to selectively open one of said valves, said cam being biased towards said diaphragm to oppose the bias of said valves, whereby said other valve opens when the pressure in said chamber falls below a predetermined value.

2. In the combination of claim 1, said cam being biased towards said diaphragm by a spring.

3. In the combination of claim 1, said cam being biased towards said diaphragm by a spring, said operating member including a skirted knob concentrically engaging a tubular extension on said housing, its extension having an interrupted key member lying in a groove in said body whereby relative rotation of the knob with respect to the housing may be effected while preventing longitudinal disengagement under the action of said spring.

4. In the combination of claim 1, said cam being biased towards said diaphragm by a spring, said operating member including a skirted knob concentrically engaging a tubular extension on said housing, its extension having an interrupted key member lying in a groove in said body whereby relative rotation of the knob with respect to the housing may be effected while preventing longitudinal disengagement under the action of said spring, and means for limiting rotation of said knob to prevent disengagement of said key member with said groove in normal use.

5. In the combination of claim 1, said cam and tubular operating member having detachable connection whereby the cam may be rotated by the tubular member and relative longitudinal movement therebetween is permitted.

6. In the combination of claim 1, said operator comprising a skirted knob and means cooperating with said body to permit rotational movement with respect thereto while preventing relative longitudinal movement for a portion of a revolution.

7. In an automatic changeover regulator and indicator the combination comprising a body forming a chamber having a flexible diaphragm forming at least a portion of one wall thereof, at least two inlets to said chamber, valves in each of said inlets biased to closed position, operators for said valves to engage said diaphragm, a tubular extension mounted on said body, a cam member slidably mounted in said extension and bearing on said diaphragm, said cam positively actuating either of said operators depending upon its position to open the associated valve, a control knob having a sleeve telescoped in said extension, a compression spring lying between said knob and cam, said tubular extension having an arcuate terminal end and a coextensive facial groove, a key member on said knob lying in said groove, a stop member mounted on said knob for cooperation with the ends of said arcuate terminal end to limit rotation of said knob at approximately 180 degrees, and means forming a splined connection between said cam and said sleeve whereby said cam may be positioned by said knob to selectively open one of said valves, said spring actuating said diaphragm to cause the other of said operators to open its associated valve when the pressure in said chamber falls below a predetermined value.

8. In the combination of claim 7, said body portion having walls forming another chamber at least a portion of which comprises a flexible diaphragm, a nozzle forming a connection between both of said chambers, valve means operated by said diaphragm for controlling the flow of fluid through said nozzle, and a gas supply connection from said second chamber.

9. A change-over pressure regulator having a body containing a chamber for gas under pressure, a diaphragm forming one wall of said chamber, two spaced valved inlets and an outlet conduit connected in communication with said chamber, valve-opening members controlling said valved inlets extending into said chamber adjacent said diaphragm, and means biasing said diaphragm into contact with a selected one of said members and finally with the other of said members depending on the pressure of gas in said chamber, said means comprising a guide secured to said body, a semi-annular projection on said guide having a semi-annular groove in its exterior, a cam rotatably and slidably mounted in said guide having a face slanted to engage said diaphragm at an angle thereto and thereby bias the same into contact with said valve-opening members in a selected order, a selector cap rotatably mounted on said guide, a boss on said cap engaging in said groove to prevent longitudinal movement of said cap relative to said guide, a detent removably secured to said cap and disposed to engage said semi-annular projection to limit the rotation of said cap to a half revolution, said cap and said cam having recesses therein, a spring received and guided in said recesses and compressed between said cap and said cam to furnish said bias, said cam and said cap having relatively slidable but relatively non-rotatable portions in engagement whereby rotating said cap rotatably positions said cam and said cam moves longitudinally relative to said body and said cap in response to the bias of said spring and said gas pressure.

10. A change-over pressure regulator having a body containing a chamber for gas under pressure, a diaphragm forming one wall of said chamber, two spaced valved inlets and an outlet conduit connected in communication with said chamber, valve-opening members controlling said valved inlets extending into said chamber adjacent said diaphragm, and means biasing said diaphragm into contact with a selected one of said members and finally with the other of said members depending on the pressure of gas in said chamber, said means comprising a guide secured to said body, a cam rotatably and slidably mounted in said guide having a face slanted to engage said diaphragm at an angle thereto and thereby bias the same into contact with said valve-opening members, a selector cap rotatably mounted on said guide, said cap and said cam having recesses therein, a spring received and guided in said recesses and compressed between said cap and said cam to furnish said bias, said cap and said cam having relatively slidable but relatively non-rotatable portions in engagement whereby rotating said cap rotatably positions said cam and said cam moves longitudinally relative to said body and said cap in response to the bias of said spring and said gas pressure.

11. A change-over pressure regulator having a body containing a chamber for gas under pressure, a diaphragm forming one wall of said chamber, two spaced valved inlets and an outlet conduit connected in communication with said chamber, valve-opening members controlling said valved inlets extending into said chamber adjacent said diaphragm, and means biasing said diaphragm into contact with a selected one of said members and finally with the other of said members depending on the pressure of gas in said chamber, said means comprising a guide secured to said body, a semi-annular projection on said guide having a semi-annular groove in its exterior, a cam rotatably and slidably mounted in said guide having a face slanted to engage said diaphragm at an angle thereto and thereby bias the same into contact with said valve-opening members, a selector cap rotatably mounted on said guide, a boss on said cap engaging in said groove to prevent longitudinal movement of said cap relative to said guide, a detent removably secured to said cap and disposed to engage said semi-annular projection to limit the rotation of said cap to a half revolution, a spring compressed between said cap and said cam to furnish said bias, said cam and said cap having relatively slidable but relatively non-rotatable portions in engagement, whereby rotating said selector cap rotatably positions said cam and said cam moves longitudinally relative to said body and said cap in response to the bias of said spring and said gas pressure.

12. A change-over pressure regulator having a body containing a chamber for gas under pressure, a diaphragm forming one wall of said chamber, two spaced valved inlets and an outlet conduit connected in communication with said chamber, valve-opening members controlling said valved inlets extending into said chamber adjacent said diaphragm, and means biasing said diaphragm into contact with a selected one of said members and finally with the other of said members depending on the pressure of gas in said chamber, said biasing means comprising a guide secured to said body, a cam rotatably and slidably mounted in said guide having a face slanted to engage said diaphragm at an angle thereto and thereby bias the same into contact with said valve-opening members in a selected order, a selector cap rotatably mounted on said guide, a spring compressed between said cap and said cam to furnish said bias, said cam and said cap having relatively slidable but relatively non-rotatable portions in engagement whereby rotating said selector cap positions said cam and said cam moves longitudinally relative to said body and said cap in response to the bias of said spring and said gas pressure.

13. In a change-over pressure regulator having a body containing a pair of inlet valves disposed to be opened in a selected order the improvement comprising a guide secured to said body, a semi-annular projection on said guide having a semi-annular groove in its exterior, a cam rotatably and slidably mounted in said guide for opening said valves in an order determined by the position of rotation of said cam, a selector cap rotatably mounted on said guide, a boss on said cap engaging in said groove to prevent longitudinal movement of said cap relative to said guide, a detent removably secured to said cap and disposed to engage said semi-annular projection to limit the rotation of said cap to a half revolution, said cap and said cam having recesses therein, a spring received and guided in said recesses and compressed between said cap and said cam to bias said valves, said cam and said cap having relatively slidable but relatively non-rotatable engaging portions exterior of said spring, whereby rotating said selector cap rotatably positions said cam and said cam moves longitudinally relative to said body and said cap in response to the bias of said spring.

14. In a change-over pressure regulator having a body containing a pair of inlet valves disposed to be opened in a selected order the improvement comprising a guide secured to said body, a cam rotatably and slidably mounted in said guide for opening said valves in an order selected by the position of rotation of said cam, a selector cap rotatably mounted on said guide, said cap and said cam having recesses therein and a spring received and guided in said recesses and compressed between said cap and said cam to furnish bias, said cam and said cap having relatively slidable but relatively non-rotatable engaging portions exterior of said spring, whereby rotating said selector cap rotatably positions said cam and said cam moves longitudinally relative to said body and said cap in response to the bias of said spring.

15. In a change-over gas pressure regulator having a body containing a pair of inlet valves disposed to be opened in a selected order, the improvement comprising a guide secured to said body, a semi-annular projection on said guide having a semi-annular groove in its exterior, a cam rotatably and slidably mounted in said guide for opening said valves in an order selected by the position of rotation of said cam, a selector cap rotatably mounted on said guide, a boss on said cap engaging in said groove to prevent longitudinal movement of said cap relative to said guide, a detent removably secured to said cap and disposed to engage said semi-annular projection to limit the rotation of said cap to a half revolution, a spring compressed between said cap and said cam, said cam and said cap having relatively slidable but relatively non-rotatable engaging portions, whereby rotating said selector cap rotatably positions said cam and said cam moves longitudinally to said body and said cap in response to said spring and said gas pressure.

16. In a change-over gas pressure regulator having a body containing a pair of inlet valves disposed to be opened in a selected order the improvement comprising a guide secured to said body, a cam rotatably and slidably mounted in said guide for opening said valves in an order selected by the position of rotation of said cam, a selector cap rotatably mounted on said guide, a spring compressed between said cap and said cam, said cam and said cap having relatively slidable but relatively non-rotatable portions in engagement outside of said spring, whereby rotating said selector cap rotatably positions said cam and said cam moves longitudinally relative to said body and said cap in response to the bias of said spring and said gas pressure.

WILLIAM R. EDDY.
THEODORE A. ST. CLAIR.

REFERENCES CITED

The following references are of record in the file of this patent:

UNITED STATES PATENTS

| Number | Name | Date |
|---|---|---|
| 258,398 | Felthousen | May 23, 1882 |
| 783,447 | Meloon | Feb. 28, 1907 |
| 916,831 | Bettinger | Mar. 30, 1909 |
| 1,179,711 | Fitts | Apr. 18, 1916 |
| 1,648,884 | Giesler | Nov. 8, 1927 |
| 2,136,690 | Jardine | Nov. 15, 1938 |
| 2,168,701 | Buttner | Aug. 8, 1939 |
| 2,197,144 | Carnes | Apr. 16, 1940 |
| 2,347,755 | Spring | May 2, 1944 |
| 2,351,135 | Krugler | June 13, 1944 |
| 2,362,352 | Buttner | Nov. 7, 1944 |
| 2,380,956 | Evarts | Aug. 7, 1945 |
| 2,396,552 | Cape | Mar. 12, 1946 |

FOREIGN PATENTS

| Number | Country | Date |
|---|---|---|
| 416,844 | France | of 1910 |